United States Patent [19]

Spies

[11] Patent Number: 4,612,502
[45] Date of Patent: Sep. 16, 1986

[54] MAGNETIC LENGTH OR ANGLE MEASURING SYSTEM HAVING IMPROVED MAGNETIC SENSOR ARRANGEMENT

[75] Inventor: Alfons Spies, Seebruck, Fed. Rep. of Germany

[73] Assignee: Dr. Johannes Heidenhain GmbH, Traunreut, Fed. Rep. of Germany

[21] Appl. No.: 481,849

[22] Filed: Apr. 4, 1983

[30] Foreign Application Priority Data

Apr. 21, 1982 [DE] Fed. Rep. of Germany ....... 3214794

[51] Int. Cl.$^4$ ................................................ G01B 7/14
[52] U.S. Cl. .................................. 324/208; 338/32 H
[58] Field of Search ............... 324/207, 208, 174, 173, 324/251, 252, 206; 338/32 H, 32 R

[56] References Cited

U.S. PATENT DOCUMENTS 3,956,793  5/1976  Pomplas ............................. 324/208
4,039,936  8/1977  Jones et al. ......................... 324/208
4,384,252  5/1983  Kolter ................................ 324/208

FOREIGN PATENT DOCUMENTS 2428785  6/1974  Fed. Rep. of Germany .

OTHER PUBLICATIONS

Inductosyn, Dr. Johannes Heidenhain GmbH, Traunreut, West Germany, Document 151 20 2/78 1E.
Die Numerische Steuerung Von Werkzeugmaschinen (Wilhelm Simon), Carl Hanser Verlag Munchen 1971, pp. 118-121.
Synchro and Resolver Conversion, edited by Geoffrey S. Boyes, Memory Devices Ltd., copyright 1980, pp. 1-10.

Primary Examiner—Ernest F. Karlsen
Assistant Examiner—Walter E. Snow
Attorney, Agent, or Firm—Willian Brinks Olds Hofer Gilson & Lione Ltd.

[57] ABSTRACT

A magnetic measuring instrument for measuring the relative position of two objects includes a scanning unit which incorporates a magnet positioned to scan a measuring division. The measuring division is provided with alternately magnetically conducting and magnetically non-conducting zones. Measuring signals of high signal quality are generated because the induction generated by the magnet in the measuring division runs only in planes perpendicular to the longitudinal extent of the measuring division (the measuring direction x). Magnetic field sensitive sensor elements in the air gap between the magnet and the measuring division scan the air gap induction to generate position dependent measuring signals.

18 Claims, 13 Drawing Figures

MAGNETIC LENGTH OR ANGLE MEASURING SYSTEM HAVING IMPROVED MAGNETIC SENSOR ARRANGEMENT

BACKGROUND OF THE INVENTION

This invention relates to a magnetic length or angle measuring instrument for measuring the relative position of a first object with respect to a second object, of the type comprising means for defining a measuring division of alternating magnetically conductive and magnetically non-conductive zones, a scanning unit mounted to scan the division, and means for evaluating signals generated by the scanning unit to determine to the relative position of the scanning unit with respect to the measuring division.

A variety of such magnetic position measuring instruments are known to the art. In West German Pat. No. 24 28 785 there is disclosed a magnetic measuring instrument for determining the position of a rod which is movable along a longitudinal direction. This cylindrical rod is formed of a magnetically conducting material and is provided on its circumference with grooves which are formed in a winding-line pattern. These grooves are filled with a magnetically non-conducting material. The rod and the material in the grooves form a division of magnetically conducting and non-conducting sections extending lengthwise along the rod. This division is scanned by a scanning unit which is arranged radially, symmetrically around the rod. This scanning unit includes a permanent magnet, pole shoes for scanning the division, and magnetic field sensitive sensor elements. In this system, the scanning unit includes several scanning regions that are distributed around the circumference of the rod in a plane perpendicular to the axis of the rod. This measuring instrument provides the disadvantage that, in the case of relatively large measuring lengths, intermediate supports for the rod are not possible, since the scanning unit surrounds the entire circumference of the rod. This instrument arranges the permanent magnet with its magnetization direction extending along the longitudinal extent of the rod. By reason of the finite hysteresis of the rod material, relatively large reversal intervals occur in the electric signals generated by the magnetic field dependent sensor elements, thereby impairing measuring accuracy. Furthermore, the scanning unit is sensitive to external magnetic interference fields because of the spatial arrangement of the scanning regions.

The publication "The Numeral Control of Machine Tools", Simon, 2nd Edition, 1971 describes in Section 4.4 a magnetic measuring device called the Accupin. This device includes a scale made up of a plurality of thin cylindrical pins of magnetically conducting material which are mounted in the grooves of a metallic bar formed of a non-magnetic material. The scanning unit includes a plurality of coils, the inductivity of which is modulated by the scale. Since the scale described in this publication includes a large number of individual parts, it is relatively expensive to manufacture and may not be sufficiently sturdy with respect to mechanical considerations for some applications.

SUMMARY OF THE INVENTION

The present invention is directed to an improved magnetic position measuring instrument of the general type described above which is simple to produce, which is sturdy in construction, which can be used to measure relatively large measuring lengths, and which generates measuring signals of such high signal quality as to permit an interpolation of the measuring signals directly.

According to this invention, a measuring instrument of the general type described above is provided with a magnet mounted to the scanning unit and oriented such that induction generated by the magnet in the measuring division extends only in planes perpendicular to the measuring direction and an air gap is created between the magnet and the measuring division. At least one magnetic field sensitive element is firmly secured adjacent the magnet to scan the measuring division, and each of these elements generates a position dependent output signal as a function of the measured induction in the air gap. Finally, means are provided for supplying the output signals of these elements to the evaluating means included in the measuring system. Further advantageous features of this invention are set forth in the dependent claims attached hereto.

The invention itself, together with further objects and attendant advantages, will best be understood by reference by the following detailed description, taken in conjunction with the accompanying drawings.

BRIEF DESCRIPTION OF THE DRAWINGS

FIG. 1b is a sectional view taken along lines 1b—1b of FIG. 1a.

FIG. 2b is a fragmentary sectional view taken along line 2b—2b of FIG. 2a.

FIG. 3b is a sectional view taken along line 3b—3b of FIG. 3a.

FIG. 4b is a sectional view taken along line 4b—4b of FIG. 4a.

FIG. 5b is a fragmentary cross-sectional view taken along line 5b—5b of FIG. 5a.

DETAILED DESCRIPTION OF THE PRESENTLY PREFERRED EMBODIMENTS

Figure 1A:
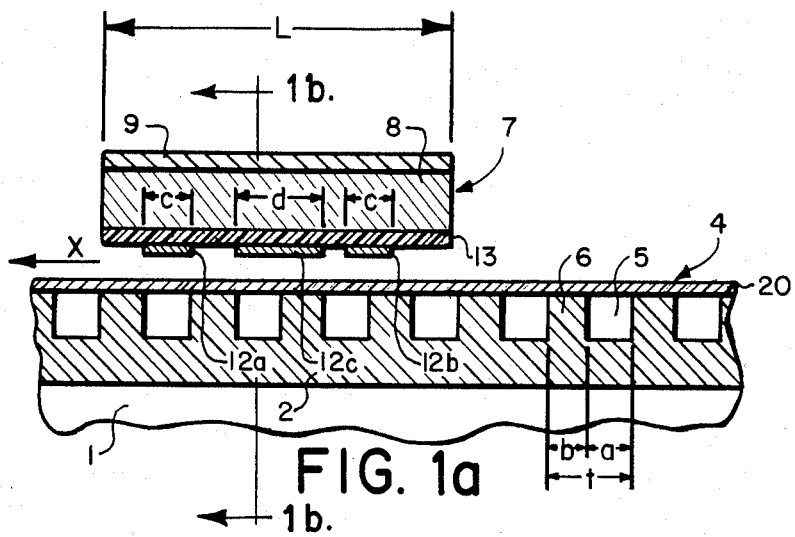
FIG. 1a is a longitudinal sectional view of portions of a first preferred embodiment of a magnetic length measuring device built in accordance with this invention.
Figure 1B:
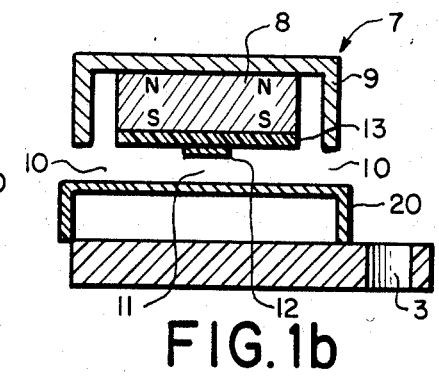

Turning now to the drawings, FIGS. 1a and 1b provide schematic representations of a longitudinal section and a cross-section, respectively, of a magnetic length measuring device which incorporates a first preferred embodiment of this invention. As shown in these figures, a scale 2 of a magnetically conducting material is mounted by means of a screw connection 3 to a bed 1 of a machine (not shown). The scale 2 defines on its upper surface a division or graduation 4 in the form of equidistant depressions 5 which are separated from one another by crosspieces 6. The depressions 5 can be filled with a magnetically neutral material to achieve a smooth upper surface of the scale 2. The division 4 has a division period t, which is made up of the length a of each of the depressions 5 and the length b of each of the crosspieces 6 along the longitudinal extent of the scale 2.

The division 4 of the scale 2 is scanned by a scanning unit 7 which is connected to a slide piece (not shown) of the machine and which is mounted for movement along the x direction, parallel to the longitudinal extent of the scale 2. The scanning unit 7 includes a permanent magnet 8 which is surrounded by a flux conducting element 9. The permanent magnet 8, the flux conducting element 9, and the scale 2 form a magnetic system which defines lateral air gaps 10 and a central air gap 11 symmetrically disposed with the respect to the center line of the division 4. The permanent magnet 8 generates a magnetic induction B in the air gaps 10, 11. The magnetic induction B is proportional to the strength of the magnetic field produced by the magnet multiplied by the permeability of the medium. By reason of the ridged tooth form of the division 4 on the surface of the scale 2, the induction B in the air gap 11 over the length L of the scanning unit is not constant along the x direction. Rather, this induction B varies with the period t of the division 4. In this preferred embodiment, three magnetic field sensitive sensor elements 12 are mounted in the air gap 11. In this preferred embodiment, the sensor elements 12 take the form of Hall elements or field plates, which are mounted directly adjacent to the division 4. Each of the sensor elements 12 generates a respective output signal proportional to the magnetic induction B in the vicinity of the sensor element 12. As shown in FIG. 1a, the length c of the sensor elements 12a, 12b in the x direction (along the longitudinal extent of the scale 2) is less than t/2, while the length d of the sensor element 12c is equal to n·t (n = 1, 2 . . . ). The sensor elements 12a, 12b are separated from one another in the x direction by a spacing of $(n+\frac{1}{4})\cdot t$ (n = 1, 2 . . . ).

As the scanning unit 7 moves along the measuring direction x, the sensor element 12a responds to the sinusoidally varying induction B in the air gap 11 to generate a measuring signal $U_1$ as follows:

$$U_1 = U_0 + U \cdot \sin 2\pi x/t. \quad \text{(Equation 1)}$$

Similarly, the sensor element 12b geneates a measuring signal $U_2$ as follows:

$$U_2 = U_0 + U \cdot \cos 2\pi x/t. \quad \text{(Equation 2)}$$

The sensor element 12c generates a measuring signal $U_3$ (for the case where n = 1):

$$U_3 = 2U_0. \quad \text{(Equation 3)}$$

This preferred embodiment includes circuitry for generating two measuring signals $U_1'$, which is equal to $U_1 - U_3/2$, and $U_2'$, which is equal to $U_2 - U_3/2$. From the foregoing Equations 1, 2 and 3, the following relations obtain:

$$U_1' = U \cdot \sin 2\pi x/t \quad \text{(Equation 4)}$$

$$U_2' = U \cdot \cos 2\pi x/t \quad \text{(Equation 5)}$$

These two measuring signals $U_1'$ and $U_2'$ are then applied to known evaluating and interpolating circuits of the prior art which process these output signals $U_1'$, $U_2'$ to determine the relative position of the scanning unit with respect to the scale.

The sensor elements 12a, 12b, 12c mounted in the scanning unit 7 can be mounted directly on the permanent magnet 8. Alternately, the sensor element 12a, 12b, 12c can be mounted to a plate 13 of a non-magnetic material which is in turn securely fastened to the permanent magnet 8. Preferably, the plate 13 comprises an electrically non-conductive material, such as for example the material printed circuit boards are made of. The plate 13 can then be used to mount electric supply lines and output signal lines for the sensor elements 12a, 12b, 12c. In the preferred embodiment of the scale 2 shown in FIG. 1, the length L of the flux conducting member 9 as well as the permanent magnet 8 is preferably arranged equal to an integral multiple of the division period t of the division 4. In this case, the total flux through the magnetic system does not vary as the scanning unit 7 moves along the scale 2, and the working point of the permanent magnet 8 therefore remains constant.

Figure 8:
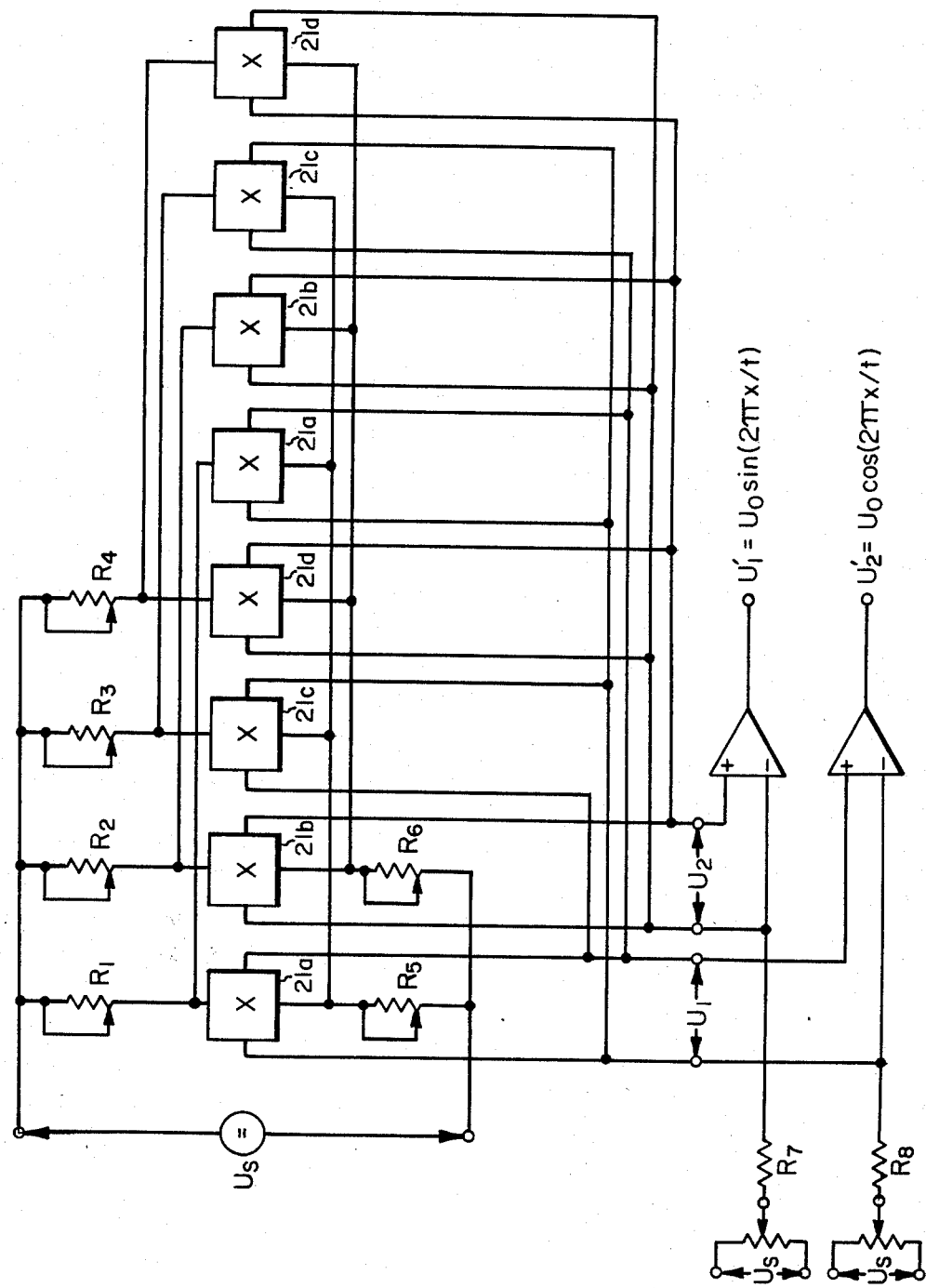
FIG. 8 is a schematic circuit diagram of a balance circuit arrangement suitable for use with the embodiment of FIG. 7.

In the movement of the scanning unit 7 along the scale 2, zones of the scale 2 that are opposite the scanning unit 7 are magnetized by a DC field. The zones of the scale 2 that are outside the zone of the scanning unit 7 have an induction that corresponds to the hysteresis of the scale material. In order to minimize the reversal interval in the output signals generated by the sensor elements 12 in response to back and forth movement of the scanning unit 7, it is important that the magnetic flux generated by the scanning unit 7 permeate the scale 2 in only one direction, so that the scale material runs through only the hysteresis curve of one quadrant (the first or third quadrant, depending on the pole arrangement of the magnet 8). The arrangement of the magnet 8 shown in FIG. 8 is particularly advantageous for this reason.

Figure 2A:
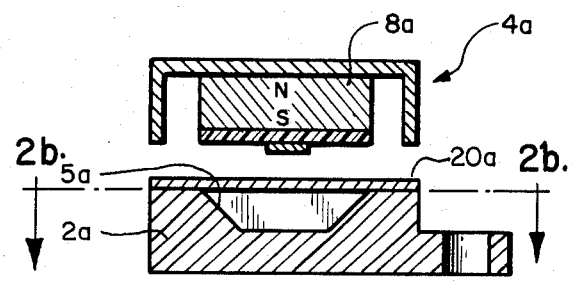
FIG. 2a is a transverse sectional view of a second preferred embodiment of the magnetic measuring device of this invention.
Figure 2B:
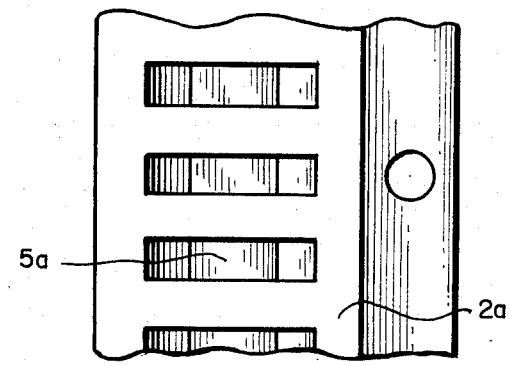

FIGS. 2a and 2b show cross-sectional and plan views of a scale 2a in which a plurality of depressions 5a are provided which do not extend to the edge of the scale 2. Rather, the depressions 5a are only about as wide as the magnet 8a of the scanning unit 4a. The scanning unit 4a corresponds in construction to the scanning unit 7 of FIG. 1. As described above, depressions 5a can be filled if desired with a non-magnetic material to provide a smooth surface of the scale 2a.

Figure 3A:
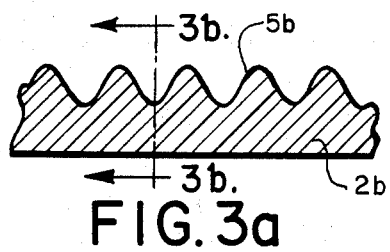
FIG. 3a is a fragmentary, longitudinal sectional view of a measuring scale suitable for use in this invention.
Figure 3B:
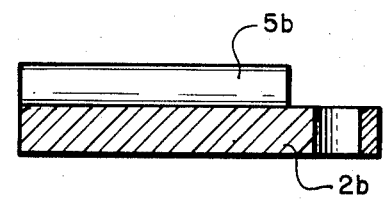
Figure 4A:
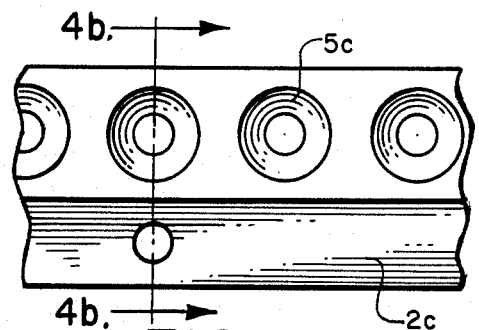
FIG. 4a is a fragmentary plan view of a portion of a measuring scale suitable for use with this invention.
Figure 4B:
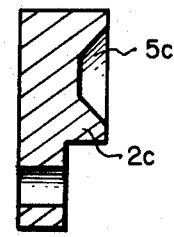

FIGS. 3a and 3b show in longitudinal and transverse section a scale 2b which is provided with trough shaped depressions 5b. FIGS. 4a and 4b are plan and cross-sectional views, respectively, of a scale 2c which is provided with a regular array of truncated conical depressions 5c. In these scales 2b, 2c desired sinusoidal output signals are obtained from the sensor elements 12a, 12b, 12c, even with a small spacing between the scanning unit and the scale 2b, 2c.

Figure 5A:
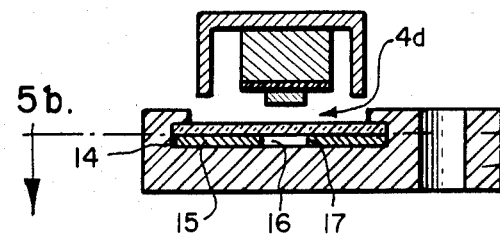
FIG. 5a is a cross-sectional view of a third preferred embodiment of a length measuring device built in accordance with this invention.
Figure 5B:
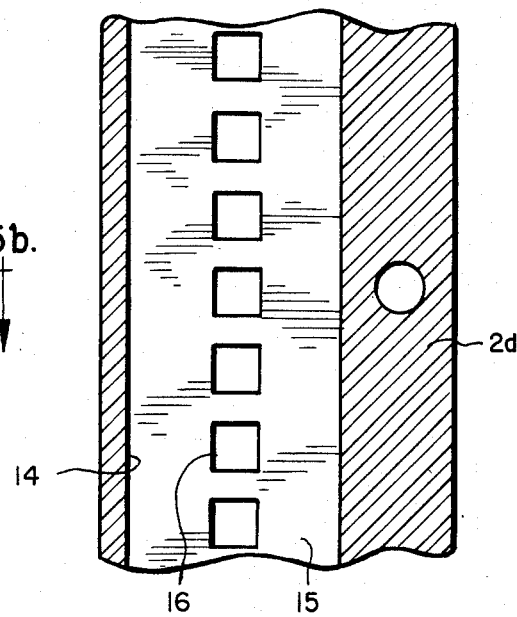

FIGS. 5a and 5b show two sectional views of a scale 2d formed of a non-magnetic material which defines a groove 14 running along the longitudinal extent of the scale 2d. A thin band 15 of soft magnetic material (such as soft steel) is mounted in the groove 14. An array of stamped recesses 16 is formed in the thin band 15 to define a measuring division 4d. In order to protect the measuring division 4d a covering foil 17 of a nonferromagnetic material is provided in the groove 14 over the thin band 15.

The depressions 5, 5a, 5b, 5c may also be covered with a protective foil 20, 20a of a suitable non-magnetic material.

For large measuring length, it is possible (in a manner not shown) for the scale to be made up of a number of component pieces joined end to end. The separating joints between individual pieces of the scale are most preferably provided in a depression. In this way, a gap formed between adjacent pieces of the scale has no adverse influence on the output signals generated by the sensor elements 12.

Figure 6:
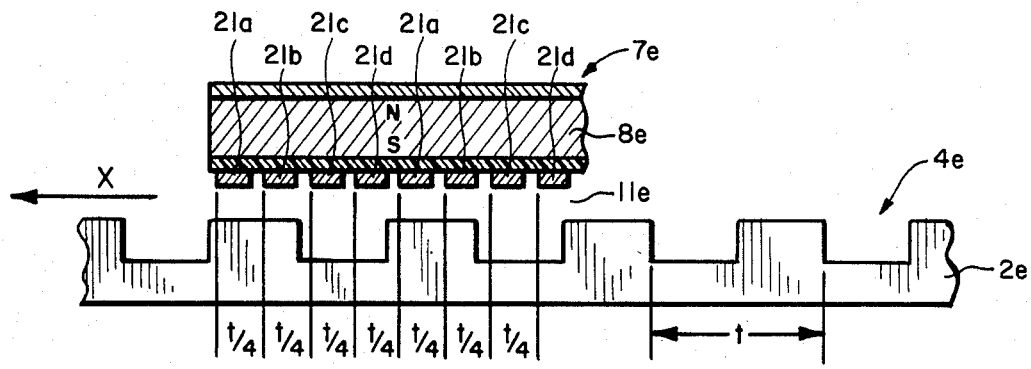
FIG. 6 is a longitudinal sectional view of portions of a fourth preferred embodiment of this invention.

FIG. 6 shows a scanning unit 7e which defines an air gap 11e in cooperation with a magnet 8e, and in which several groups of sensor elements are provided, each of which comprises four sensor elements 21a, 21b, 21c, 21d. The active length of each of these sensor elements 21a–21d along the x direction (parallel to the longitudinal extent of the scale 2e) is not greater than ¼ the division period t of the division 4e. The output signals of the sensor elements 21a, 21c which are separated from one another by the spacing of n·t/2 (n=1, 2 ...) are combined with one another into a first signal group in such a way that the measuring signals produced by the sensor elements having the spacing n·t (n=1, 2 ...) are summed with one another, and the output signals of the sensor elements having the spacing (k+½)·t (k=0, 1, 2 ...) are summed together and then subtracted from the sensor elements with the spacing n·t. The output signals of the remaining sensor elements 21b, 21d form a second signal group and are linked with one another in a manner analogous to that described above in conjunction with the sensor elements 21a, 21c. The sensor elements 21a, 21c of the first group and the sensor elements 21b, 21d of the second group yield output signals of the following form:

$$U_1 = U \cdot \sin 2\pi x/2t, \qquad \text{(Equation 6)}$$

$$U_2 = U \cdot \cos 2\pi x/t, \qquad \text{(Equation 7)}$$

which again are applied to a known evaluating and interpolating circuit of the prior art.

The sensor elements 21a–21d can also be provided with a spacing with respect to one another greater than t/4. For example, a spacing equal to n·t/2+t/4 (n=1, 2, ...) can be used. In this arrangement, the sensor elements 21a, 21c having the spacing k·t/2 (k=1, 2, ...) should be combined into a first group and the remaining elements 21b, 21d combined into a second group. In this manner, the sensor elements 21a–21d can have a length up to t/2 in the measuring direction.

Figure 7:
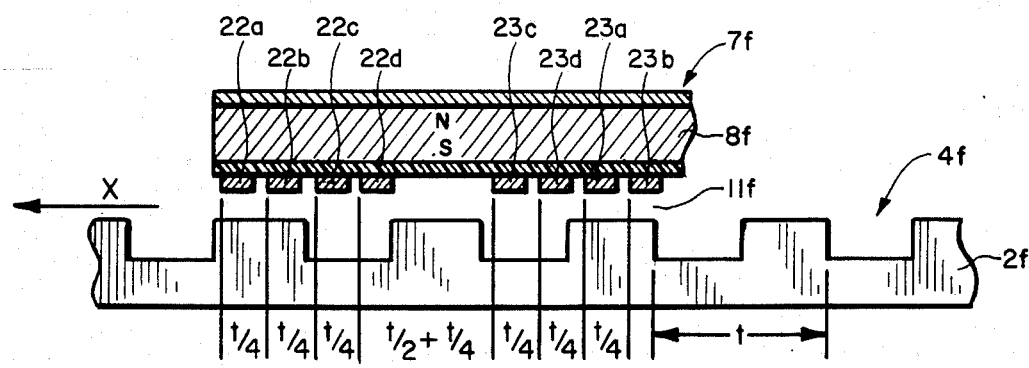
FIG. 7 is a longitudinal sectional view of portions of a fifth preferred embodiment of this invention.

In FIG. 7 there is shown a scanning unit 7f in which a magnet 8f cooperates with a scale 2f to define an air gap 11f in which are arranged at least two groups of sensor elements, each group including four sensor elements 22a, 22b, 22c, 22d; 23c, 23d, 23a, 23b. Between the sensor elements 22a, 22b, 22c, 22d of the first group and the sensor elements 23c, 23d, 23a, 23b of the second group, there is provided a free space having a length equal to n·t/2+t/4 (n=1, 3, 5, ...).

The first measuring signal is generated as a function of the difference between first and third sensor elements separated by a distance of k·t/2 (k=1, 3, 5 ...) and the second measuring signal is generated as a function of the difference between the second and fourth sensor elements separated by a distance of k·t/2 (k=1, 3, 5 ....). The output signals of the sensor elements 22a, 22b, 22c, 22d; 23c, 23d, 23a, 23b are again divided into two signal groups. For the first signal group, the measuring signals of the sensor elements 22a, 23a are summed and from this sum there is subtracted the combined output signals of the sensor elements 22c, 23c. The remaining sensor elements 22b, 23b, 22d, 23d are circuited in a manner analogous to that described above.

FIG. 8 shows a suitable circuit arrangement which can be used for balancing the output signals of the sensor elements of the embodiments of FIGS. 6 or 7. In these embodiments, Hall elements are used for the sensor elements. Across two terminals of the circuit of FIG. 8, there is applied a constant direct voltage $U_s$, which is applied via resistors $R_1$ through $R_6$ to supply the Hall elements 21a through 21d with the necessary control current $I_{st}$. As is well known, the output voltage of a Hall element is described as follows:

$$U_H = R_H \cdot (I_{st} \cdot B), \qquad \text{(Equation 8)}$$

where $R_H$ is equal to the Hall constant for the Hall element, and B is equal to the magnetic induction sensed by the Hall element. The outputs of the Hall elements are circuited with one another in sum and difference in the manner already described above in conjunction with FIGS. 6 and 7 to generate two signals $U_1$, $U_2$ which are applied to the differential amplifiers $V_1$ and $V_2$.

Into the feed lines of the first group of Hall elements, variable resistors $R_1$, $R_3$, and $R_5$ are provided with which the control current of the individual Hall elements can be altered. The control lines of those elements, the outputs of which are connected with one another, are circuited in parallel.

With the variable resistors $R_1$ and $R_3$, the control currents are set in such a way that in the case of spacing changes between the scanning unit and the scale the direct voltages at first superposed on the signal $U_1$ do not change. The resistors $R_1$ and $R_4$, which belong to the second group ($U_2$) are analogously adjusted.

The resistors $R_5$ and $R_6$ are provided in the common return line of the elements of these two signal groups, respectively. By means of the resistors $R_5$ and $R_6$ the amplitudes of the two signals $U_1$ and $U_2$ can be adjusted for equality. The remaining direct voltage constituents of the signals $U_1$ and $U_2$ are balanced to zero by current summation through the variable resistors $R_7$ and $R_8$ in order to generate the output voltages $U_1'$ and $U_2'$.

In alternate embodiments, the Hall elements can be driven, instead of with a direct voltage $U_s$, with an alternating voltage. In these preferred embodiments, the evaluating and interpolating circuits known to the prior art as Synchro, Resolver, and Inductosyn can then be utilized. See, e.g., the brochure entitled "Synchro and Resolver Conversion", edited by Geoffrey S. Boyes and published by Memory Devices Ltd., Surrey, U.K. (1980, ISBN 0-916550-06-0, pp 1–10) and the brochure entitled "Inductosyn" published by Dr. Johannes Heidenhain GmbH, Traunreut, West Germany (1978, Doc. No. 151 20 2/78 IE) for a discussion of these circuits.

Of course, it should be understood that a wide variety of changes and modifications to the preferred embodiments described above will be apparent to those skilled in the art. It is therefore intended that the foregoing detailed description be regarded as illustrative rather than limiting, and that it be understood that it is the following claims, including all equivalents, which are intended to define the scope of this invention.

I claim:

1. In a magnetic measuring system for measuring the relative position of a first object with respect to a second object in a measuring direction, said system comprising means for defining a measuring division of alternating magnetically conducting and magnetically non-conducting zones, a scanning unit mounted to scan the division, and means for evaluating measuring signals to determine the position of the scanning unit with respect to the measuring division, the improvement comprising:

at least one magnet mounted to the scanning unit and oriented such that induction generated by the magnet in the measuring division extends only in planes perpendicular to the measuring direction and an air gap is created between the magnet and the measuring division;

at least one magnetic field sensitive element firmly secured adjacent the magnet to scan the measuring division, each of which elements generates a position dependent output signal as a function of measured magnetic induction in the air gap; and means for supplying the output signals to the evaluating means;

wherein the measuring division defines a division period t;

wherein the at least one magnetic field sensitive element comprises first, second and third magnetic field sensitive elements;

wherein the length of the first and third elements in the measuring direction is less than $t/2$;

wherein the separation between the first and third elements is equal to $(n+\frac{1}{4}) \cdot t$ $(n=1, 2, 3, \ldots)$;

wherein the length of the second element in the measuring direction is equal to $n \cdot t$ $(n=1, 2, 3 \ldots)$;

wherein the supplying means operates to supply a first measuring signal, proportional to the difference between the signal of the first element and half the signal of the second element, and a second measuring signal, proportional to the difference between the signal of the third element and half the signal of the second element, to the evaluating means.

2. The invention of claim 1 wherein the means for defining the division comprises a carrier formed of a soft magnetic material which defines an alternating array of depressions and ridges.

3. The invention of claim 3 wherein the alternating array of depressions and ridges is shaped in the form of a gear track.

4. The invention of claim 1 wherein the means for defining the division comprises a scale which defines an array of trough shaped depressions.

5. The invention of claim 1 wherein the means for defining the division comprises a scale which defines an array of truncated conical depressions.

6. The invention of claim 1 wherein the means for defining the division comprises;

a profile of a non-magnetic material which defines a groove; and a thin band of soft magnetic material positioned in the groove, which band defines an array of recesses.

7. The invention of claim 1 further comprising a flux guide positioned partially to surround the magnet to direct the magnetic field of the magnet and to shield the magnet against interference.

8. The invention of claim 1 further comprising a plate of non-magnetic material secured to the magnet wherein the at least one magnetic field sensitive element is mounted on the plate.

9. The invention of claim 8 wherein the plate comprises an electrically non-conductive material, and wherein the plate supports at least one electrical supply conductor and at least one measurement signal conductor coupled to the element.

10. In a magnetic measuring system for measuring the relative position of a first object with respect to a second object in a measuring direction, said system comprising means for defining a measuring division of alternating magnetically conducting and magnetically non-conducting zones, a scanning unit mounted to scan the division, and means for evaluating measuring signals to determine the position of the scanning unit with respect to the measuring division, the improvement comprising:

at least one magnet mounted to the scanning unit and oriented such that induction generated by the magnet in the measuring division extends only in planes perpendicular to the measuring direction and an air gap is created between the magnet and the measuring division;

at least one magnetic field sensitive element firmly secured adjacent the magnet to scan the measuring division, each of which elements generates a position dependent output signal as a function of measured magnetic induction in the air gap; and means for supplying the output signals to the evaluating means;

wherein the measuring division defines a division period t;

wherein the at least one magnetic field sensitive element comprises first, second, third and fourth elements;

wherein the length of each of the four elements in the measuring direction is less than $t/4$;

wherein the separation between each pair of the four elements is equal to $n \cdot t/4$ $(n=1, 2, 3 \ldots)$; and wherein the supplying means comprises:

means for generating a first measuring signal as a function of the difference between the signals generated by the first and third elements, which are separated by a distance of $k \cdot t/2$ $(k=1, 3, 5 \ldots)$;

means for generating a second measuring signal as a function of the difference between the signals generated by the second and fourth elements, which are separated by a distance of $k \cdot t/2$ $(k=1, 3, 5 \ldots)$; and means for supplying the first and second measuring signals to the evaluating means.

11. The invention of claim 10 wherein the means for defining the division comprises a carrier formed of a soft magnetic material which defines an alternating array of depressions and ridges.

12. The invention of claim 11 wherein the alternating array of depressions and ridges is shaped in the form of a gear track.

13. The invention of claim 10 wherein the means for defining the division comprises a scale which defines an array of trough shaped depressions.

14. The invention of claim 10 wherein the means for defining the division comprises a scale which defines an array of truncated conical depressions.

15. The invention of claim 10 wherein the means for defining the division comprises:

a profile of non-magnetic material which defines a groove; and a thin band of soft magnetic material positioned in the groove, which band defines an array of recesses.

16. The invention of claim 10 further comprising a flux guide positioned partially to surround the magnet to direct the magnetic field of the magnet and to shield the magnet against interference.

17. The invention of claim 10 further comprising a plate of non-magnetic material secured to the magnet wherein the at least one magnetic field sensitive element is mounted on the plate.

18. The invention of claim 17 wherein the plate comprises an electrically non-conductive material, and wherein the plate supports at least one electrical supply conductor and at least one measurement signal conductor coupled to the element.

* * * * *

UNITED STATES PATENT AND TRADEMARK OFFICE
CERTIFICATE OF CORRECTION

PATENT NO. : 4,612,502

DATED : September 16, 1986

INVENTOR(S) : Alfons Spies

It is certified that error appears in the above-identified patent and that said Letters Patent is hereby corrected as shown below:

On the title page:

IN THE REFERENCES CITED
U.S. PATENTS DOCUMENTS

Please delete "3,956,793" and substitute therefor --3,956,973--.

IN THE DETAILED DESCRIPTION OF THE
PRESENTLY PREFERRED EMBODIMENTS

In column 3, line 67, please delete "$U_2'=U'\cos 2\pi x/t$" and substitute therefor --$U_2'=U\cdot\cos 2\pi x/t$--.

IN THE CLAIMS

In Claim 3 (column 7, line 46), please delete "3" and substitute therefor --2--.

Signed and Sealed this

Fourteenth Day of February, 1989

Attest:

DONALD J. QUIGG

Attesting Officer

Commissioner of Patents and Trademarks